United States Patent [19]

Nehmer et al.

[11] 4,138,723
[45] Feb. 6, 1979

[54] MOTOR VEHICLE SPEED CONTROL SYSTEM

[75] Inventors: Carl A. Nehmer, Lapeer; Douglas W. Sweet, Flint, both of Mich.

[73] Assignee: General Motors Corporation, Detroit, Mich.

[21] Appl. No.: 823,920

[22] Filed: Aug. 12, 1977

[51] Int. Cl.² ............... G05D 13/58; B60K 31/00
[52] U.S. Cl. ................. 364/424; 180/105 E; 364/426; 364/565
[58] Field of Search ............... 364/424, 426; 361/242; 180/105 E; 324/78 D

[56] References Cited

U.S. PATENT DOCUMENTS

| 3,570,622 | 2/1971 | Wisner | 180/105 E |
| 3,599,154 | 8/1971 | Carol, Jr. et al. | 180/105 E |
| 3,655,962 | 4/1972 | Koch | 364/426 |
| 3,766,367 | 10/1973 | Sumiyoshi et al. | 364/424 |
| 3,869,019 | 3/1975 | Cardani | 180/105 E |
| 3,885,137 | 5/1975 | Ooya et al. | 364/424 |
| 3,891,046 | 6/1975 | Oicles | 180/105 E |
| 3,941,202 | 3/1976 | Sorkin | 361/242 |
| 3,952,829 | 4/1976 | Gray | 180/105 E |
| 4,046,213 | 9/1977 | Larson | 180/105 E |
| 4,072,206 | 2/1978 | Larson et al. | 364/426 |

FOREIGN PATENT DOCUMENTS 2546529   4/1977   Fed. Rep. of Germany ....... 180/105 E

*Primary Examiner*—Felix D. Gruber
*Attorney, Agent, or Firm*—Albert F. Duke

[57] ABSTRACT

A digital speed control system including a processor performing arithmetical and logic operations in response to command inputs from the operator to maintain the present vehicle speed, to accelerate at a substantially constant rate to a new cruising speed or to a previously established cruising speed is disclosed. Certain processor operations are phased to speed sensor pulses to permit rate of change of speed computations to be performed with minimum hardware.

11 Claims, 12 Drawing Figures

| STATE | ADDER INPUTS | | | DATA TRANSFERS | | | DESCRIPTION |
|---|---|---|---|---|---|---|---|
| | A1 | B1 | B2 | ORIGIN | CONTROL | DESTINATION | |
| $\overline{M_N}$ | $TACH_R$ | $-TACH_R/K2$ | 0 | S2 | $\overline{M_N}$ | TACH REG. | SPEED CALCULATION |
| M0 | $TACH_R$ | $K1\cdot TACH_R/K2$ | 0 | S2 | M0 | TACH REG. | |
| M1 | $TACH_R$ | $TACH_R/K3$ | K4 | S2 | $\overline{ACC+SET}$ | SET REG. | SET SPEED LOCKUP ERROR CORRECTION (B1) AND DUTY CYCLE OFFSET CONSTANT (K4) |
| | | | | S2 | (ACC'·ENG) | DEMAND REG. | |
| M2 | T0 | $COUNT_R$ | 0 | S1 | M2 | COUNT REG. | INCREMENT COUNT REGISTER |
| | | | | CO2 | | UPDATE F/F | UPDATE PERIOD CONTROL |
| M3 | K5<br>K6(ACC'+ENG) | $DEMAND_R$ | 0 | S1 | UP | DEMAND REG. | INCREMENT DEMAND REGISTER |
| | | | $-SET_R(\overline{ACC+RES})$<br>$-TACH_R(ACC+RES)$ | | | | |
| | | | $K7(\overline{ACC})$<br>$-SET_R(ACC)$ | CO2 | M3 | $(ACC+RES)$ F/F | EXIT FROM ACCELERATE OR RESUME MODES |
| M4 | $-TACH_R$ | $TACH_{N-1}$ | 0 | $2^3$-S2 | UP | $TACH_{N-1}$ REG. | DERIVATIVE TERM COMPUTATION AND STORAGE |
| M5 | $-TACH_R$ | $TACH_{N-1}$ | $SET_R(\overline{ACC+RES})$<br>$DEMAND_R(ACC+RES)$ | $2^2$-S2 | UP | DUTY REG. | DUTY CYCLE COMPUTATION |
| | | | | $TACH_R$ | UP | $TACH_{N-1}$ REG. | DERIVATIVE TERM UPDATE |
| STATE | A3 | B3 | | CO3 | | OUTPUT F/F | DUTY CYCLE GENERATION |
| EACH WORD TIME | $DUTY_R$ | $RAMP_R$ | | | | | |

*Fig. 8*

MOTOR VEHICLE SPEED CONTROL SYSTEM

This invention relates to improvements in motor vehicle speed control systems and more particularly to a multimode speed control system including cruise, accelerate and resume modes of operation and utilizing digital techniques for implementing such modes of operation.

Speed control systems utilizing digital techniques for controlling vehicle speed have been proposed in such patents as Cardani U.S. Pat. No. 3,869,019, Oicles U.S. Pat. No. 3,891,046, Sorkin U.S. Pat. No. 3,941,202, Ooya et al. U.S. Pat. No. 3,885,137 and Koch U.S. Pat. No. 3,655,962. Speed control systems have also been proposed which include a so-called resume mode of operation wherein the vehicle is accelerated to a previous cruise speed. An example of one such system is Wisner U.S. Pat. No. 3,570,622.

It is an object of the present invention to provide an improved digital speed control system.

It is another object of the present invention to provide a digital speed control system wherein the operator may selectively command that the vehicle be accelerated at a substantially constant rate to a new cruising speed or to a previously established cruising speed.

It is another object of the present invention to provide a digital speed control system which includes a processor which is phased to pulses from a speed sensor in order to minimize digital component requirements and improve reliability.

In accordance with the present invention a multimode digital controller responds to manual inputs from the vehicle operator to provide an output signal which is supplied to a throttle actuator to control the vehicle speed in accordance with the command inputs. The electronic controller includes a processor for performing arithmetical and logic operations and a plurality of registers for storing data. The processor responds to sender pulses having a frequency related to the vehicle speed. The present vehicle speed is updated for each sender pulse and stored in a present speed register. A prior speed register which is updated at a substantially constant time interval is provided for storing the vehicle speed which was present at an earlier time. The update period occurs after a plurality of sender pulses depending upon the speed of the vehicle to maintain a substantially constant update period. By processing the contents of the present and prior speed registers each update period a component related to the rate of change of vehicle speed is obtained which is added to any error existing between the actual vehicle speed as contained in the present speed register and a desired vehicle speed as provided in a set speed register during the cruise mode of operation or a demand register during the accelerate or resume modes of operation. When the cruise mode of operation is commanded by the operator the present speed of the vehicle modified to incorporate certain constants associated with the particular throttle actuator is loaded into the set register. The difference between the contents of the set register and present speed register is added to the derivative component to produce a binary word which is stored in a duty register. The word stored in the duty register is then converted to a pulse width modulated signal for controlling the throttle actuator. If the accelerate mode of operation is commanded the demand register is incremented by a fixed amount each update period and compared with a binary word representing some upper speed limits. Until the upper speed limit is reached the incremental difference between the demand register and the present speed register provides an error to accelerate the vehicle at a substantially constant rate. If the cruise mode of operation is terminated, such as by applying the vehicle brakes, the cruise speed present in the set register prior to termination of the cruise mode is retained and at some future time if the resume mode of operation is commanded the previously described accelerate mode is initiated except in this case the accelerate mode is terminated when the content of the demand register exceeds the content of the set register at which time the desired vehicle cruising speed is maintained.

A more complete understanding of the invention may be had from the following detailed description which should be read in conjunction with the drawings in which.

Figure 2:
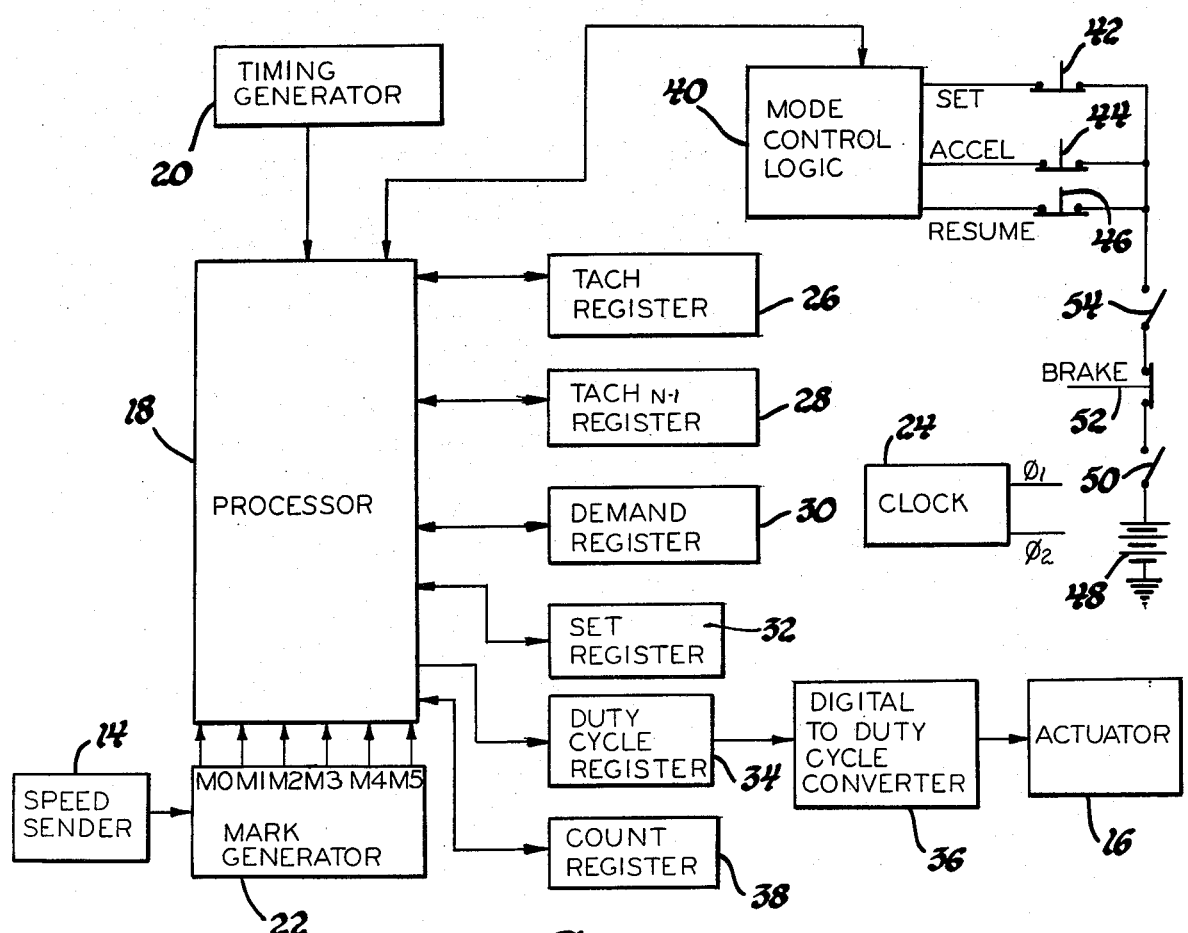
FIG. 2 is a more detailed block diagram of portions of the system shown in FIG. 1.

FIGS. 5 through 7 and 9 through 12 are more detailed logic diagrams of the components shown in FIG. 2;

FIG. 8 is a chart indicating the various functions being performed at specific time intervals and is useful in understanding the invention.

Figure 1:
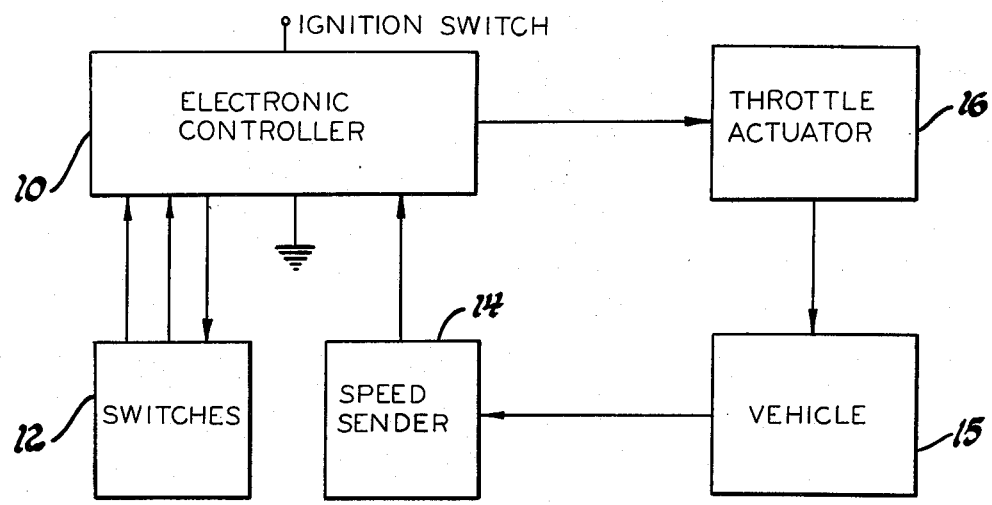
FIG. 1 is a block diagram of the system of the present invention.

Referring now to the drawings and initially to FIG. 1, the cruise control system of the present invention includes an electronic controller 10 which responds to a plurality of driver actuated switches generally designated 12 and a speed sender generally designated 14. The speed sender 14 provides a variable frequency input related to the speed of the vehicle 15. The controller 10 produces a constant frequency variable duty cycle output signal to a throttle control mechanism generally designated 16. The duty cycle of the output signal is varied as necessary to control the speed of the vehicle 15. A suitable throttle control mechanism is described in co-pending patent application Ser. No. 632,398, filed Nov. 17, 1975 now U.S. Pat. No. 4,082,158. The speed sender 14 is preferable that disclosed in co-pending patent application Ser. No. 690,848, filed May 28, 1976 now U.S. Pat. No. 4,051,434. Both applications are assigned to the assignee of the present invention and are incorporated herein.

Figure 3:
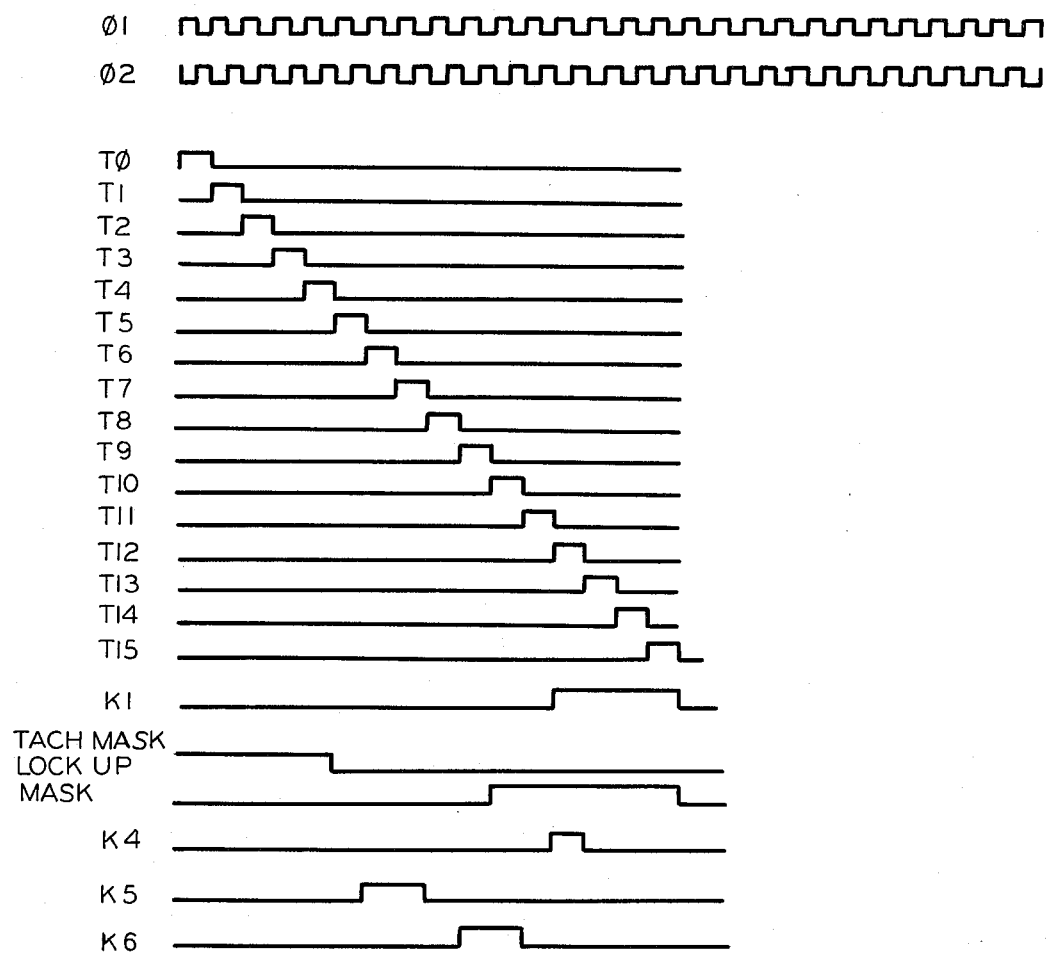
FIGS. 3 and 4 are timing diagrams useful in describing the operation of the system.

Referring now to FIG. 2, the electronic controller 10 comprises a processor generally designated 18 which receives inputs from a timing generator 20 and a mark generator 22. The timing generator 20 generates timing waveforms T0-T15, shown in FIG. 3, in response to the $\phi 1$ and $\phi 2$ outputs of a basic clock 24. $\phi 1$ and $\phi 2$ are 132 KHz square wave signals and are also supplied to the other blocks shown in FIG. 2. The timing generator 20, by combining various of the signals T0-T15, also produces certain predetermined bit patterns and masks, shown in FIG. 3, for use in the processor 18.

The speed sender 14 provides an input to the MARK generator 22 of approximately 0.55 Hz/mph. The MARK generator 22 responds to this input and generates a sequence of six 16 bit word intervals. These intervals are designated M0-M5 in FIG. 4 starting with the first complete machine word (i.e., the falling edge of T15) following a 0-1 transition of a speed sender pulse. $\overline{M_N}$ though not actually generated is shown as consisting of all 16 bit word intervals other than M0-M5. During each 16 bit word interval (121.2 micro-seconds) a computation is performed by the processor 18. It should be understood that the timing signals T0–T15 occur during a single word interval such as M0.

The processor 18 transfers and/or receives data from a plurality of registers including a TACH register 26, a $TACH_{N-1}$ register 28, a demand register 30, a set speed register 32, a duty cycle register 34, and a count register 38. The processor 18 communicates with the input switches 12 through mode control logic generally designated 40. The switches 12 comprise a normally closed set switch 42, normally closed accel switch 44 and a normally closed resume switch 46. The switches 42, 44 and 46 are connected with the vehicle battery 48 through an ignition switch 50, a normally closed brake switch 52 and an on/off switch 54. During normal operation of the system, the switches 42, 44 and 46 provide a high or logic one input to the mode control logic 40. The set switch 42 is actuable to initiate the cruise mode of operation at the prevailing vehicle speed. The accel switch 44 is actuable for causing the vehicle to accelerate at a controlled rate of acceleration, to a new cruise speed which is the prevailing vehicle speed at the time of release of the accel switch 44. The resume switch 46 is actuable for causing the vehicle to accelerate at the aforementioned controlled rate of acceleration, from the vehicle speed at the time of switch actuation to a previous cruise speed i.e., the vehicle speed set during the previous cruise mode of operation, and thereafter maintain the cruise speed.

The TACH register 26 is a 16 bit register and contains the present vehicle speed as determined from the frequency of the pulses obtained from the speed sender 14. The register 26 is scaled so that full scale is approximately 110 miles per hour. The $TACH_{N-1}$ register is a 16 bit register and stores the content of the TACH register 26 which existed at an earlier time for use in computing a derivative term. The demand register 30 is a 16 bit register and stores a vehicle speed for scheduling acceleration in the accelerate or resume modes of operation. The set register 32 is an 8 bit register and stores the desired cruise control speed when the system is placed in a cruise mode of operation. The duty cycle register 34 is a 8 bit register and stores the computed duty cycle required to obtain the desired cruise control speed. The count register 38 is a 4 bit register for counting pulses from the speed sender 14 for use in establishing a substantially constant update period. The content of the duty cycle register 34 is converted to a pulse width modulated fixed frequency control signal by a converter 36 and as previously mentioned is applied to the control mechanism 16 for controlling the vehicle speed.

The mode control logic 40 includes logic circuitry for interpreting the inputs to the system and provides the necessary logic signals to the processor 18. The logic receives the three inputs designated SET, ACCEL and RESUME as well as inputs from the timing generator 20 and the mark generator 22 through the processor 18.

Figure 5:
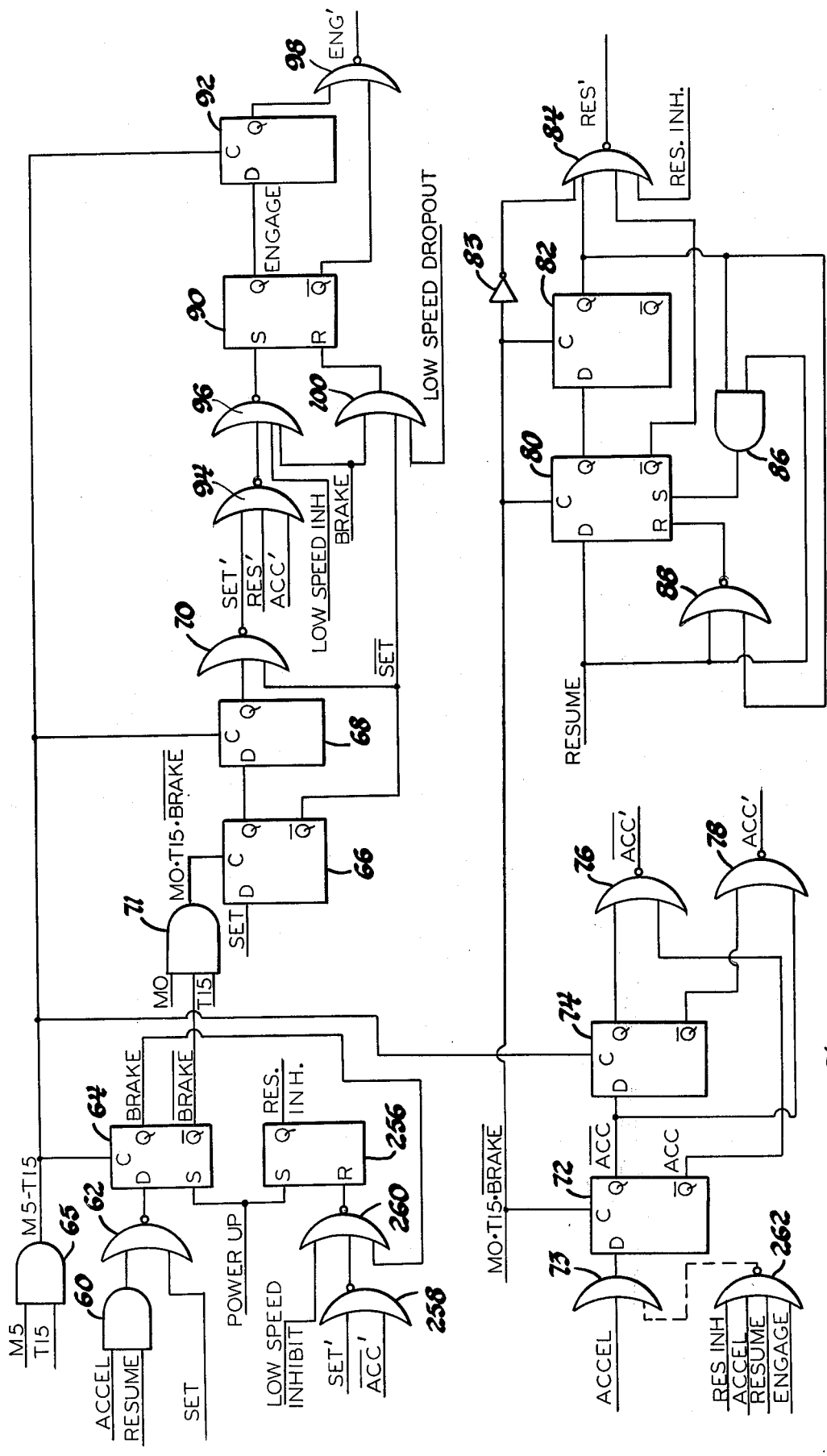

The mode control logic 40 responds to the three inputs SET, ACCEL and RESUME, to determine the status of the brakes. As shown in FIG. 5, the ACCEL and RESUME inputs are applied to an AND gate 60 the output of which is applied to a NOR gate 62 along with the SET input. If the brake switch 52 is actuated SET, ACCEL and RESUME will all be low causing the output of the NOR gate 62 to go high. The output of the gate 62 and therefore the status of the brakes is stored in flip-flop 64 at its Q output, designated BRAKE, on the falling edge of T15 during M5 through AND gate 65. The flip-flop 64 is initialized to the state where BRAKE is high by a momentary signal designated POWER UP which sets the flip-flop 64 when power is applied to the system.

A momentary signal designated SET' is generated upon release of the SET switch 42. The logic comprises flip-flops 66 and 68 and gate 70. The D input of the flip-flop 66 is connected with the SET switch and is clocked from the signal M0.T15.$\overline{\text{Brake}}$ at the output of gate 71. The flip-flop 68 has its D input connected with the Q output of the flip-flop 66 and is clocked from gate 65 by a signal designated M5.T15. The Q output of the flip-flop 68 and the $\overline{Q}$ output of the flip-flop 66 provide inputs to the gate 70. As long as the set switch is deactuated the input to the flip-flop 66 is high and the Q output of the flip-flop 68 is high, holding SET' low. When the SET switch is actuated the input to the flip-flop 66 goes low and assuming the brakes are not actuated the flip-flop 66 is clocked on the falling edge of T15 during M0 driving the Q output of the flip-flop 66 low and the $\overline{Q}$ output of the flip-flop 66 high which holds SET' low. During M5 the flip-flop 68 is clocked driving its Q output low. When the SET switch is released the flip-flop 66 is clocked during M0 to drive $\overline{Q}$ low causing both inputs to the gate 70 to be low and its output high. During M5 the flip-flop 68 transfers a high at its input to the Q output driving SET' low. Accordingly, the $\overline{Q}$ output of the flip-flop 66 designated $\overline{\text{SET}}$ provides the inverse of the SET switch state synchronized with the M0 time interval and SET' is a momentary pulse rising on the falling edge of the T15 pulse occurring during M0 and falling on the falling edge of the T15 pulse occurring during M5.

The logic for producing a momentary pulse upon actuation or release of the ACCEL switch 44 includes flip-flops 72 and 74 and gates 76 and 78. The signal $\overline{\text{ACC}}'$ is produced upon release of the ACCEL switch 44 in the same manner that the aforementioned SET' signal was produced upon release of the SET switch 42. The signal designated ACC' is a momentary pulse of the same duration as $\overline{\text{ACC}}'$ but is initiated upon actuation of the ACCEL switch 44. As long as the ACCEL switch 44 is deactuated i.e., released the input to the flip-flop 72 is high through gate 73. Accordingly the input to the gate 76 from the flip-flop 74 is high maintaining $\overline{\text{ACC}}'$ low and the input to the gate 78 from the flip-flop 72 is high maintaining ACC' low. When the ACCEL switch 44 is actuated the input to the flip-flop 72 goes low. If the brakes are not applied the flip-flop 72 is clocked during M0 causing both inputs to the gate 78 to go low and ACC' to go high. During M5 the input to the gate 78 from the flip-flop 74 goes high driving ACC' low. The signal $\overline{\text{ACC}}'$ is maintained low by the high input from the flip-flop 72. When the ACCEL switch 44 is released both inputs to the gate 76 go low during M0 and remain low until M5 causing $\overline{\text{ACC}}'$ to go high. During M5 the flip-flop 74 is clocked driving $\overline{\text{ACC}}'$ low.

The logic responding to actuation of the RESUME switch 46 includes flip-flops 80 and 82, inverter 83 and gate 84. The flip-flops 80 and 82 are both clocked from the signal M0.M15.$\overline{\text{Brake}}$. The output of the gate 84 is designated RES' and is a momentary signal of duration M0.T15 and occurs upon release of the RESUME switch 46. The gate 86 and the gate 88 form debounce circuitry responsive to the input of the flip-flop 80 and the output of the flip-flop 80 to ensure that the RESUME switch is depressed for at least the interval of time between consecutive M0 periods. If the RESUME switch is actuated and then deactuated before the flip-flop 82 is clocked then the flip-flop 80 is driven to its previous state.

The logic responding to SET', RES' and ACC' comprises flip-flops 90 and 92, gates 94, 96 and 98 and an OR gate 100. The flip-flop 90 is reset from the gate 100 to drive the outputs designated ENGAGE and ENG' low if the brakes are applied or the SET switch 42 is actuated. Upon actuating the ACCEL switch 44 or upon release of the SET switch 42 or RESUME switch 46 a positive going pulse will be applied to one of the inputs to the gate 94 causing its output to go low. If the brakes are not applied and the vehicle speed is above a predetermined speed all inputs to the gate 96 will be low and the output will go high setting the flip-flop 90 driving ENGAGE high and the $\overline{Q}$ output of the flip-flop 90 low so that both inputs to the gate 98 are low and the output ENG' goes high. During M5 the flip-flop 92 is clocked driving its Q output high and ENG' low. Thus the Q output of the flip-flop 90 indicates the state of the system i.e., whether it is in a cruise mode of operation or not and the output of the gate 98 provides a momentary pulse in response to release of either the SET switch 42 or the RESUME switch 46 or actuation of the ACCEL switch 44.

Figure 6:
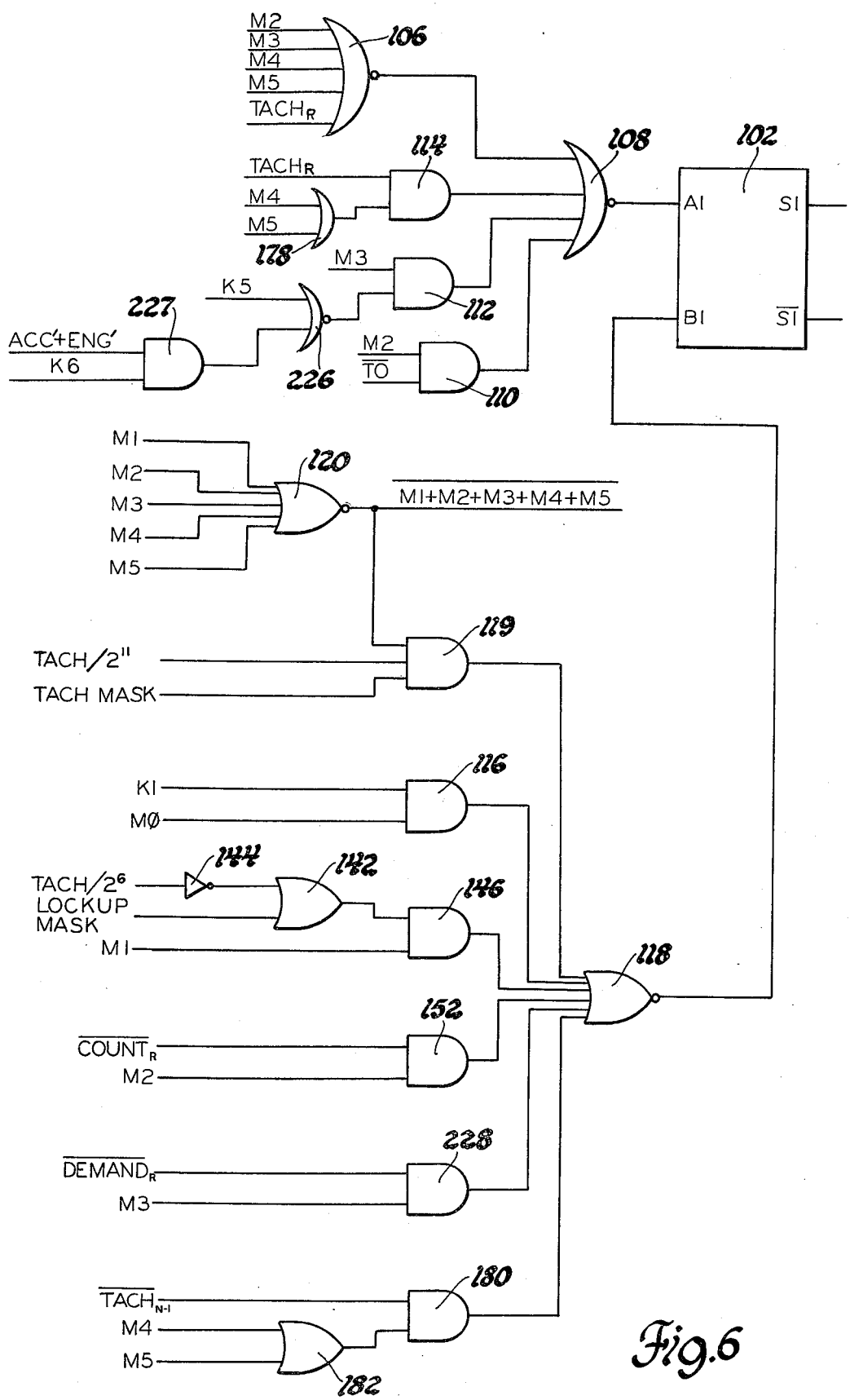
Figure 7:
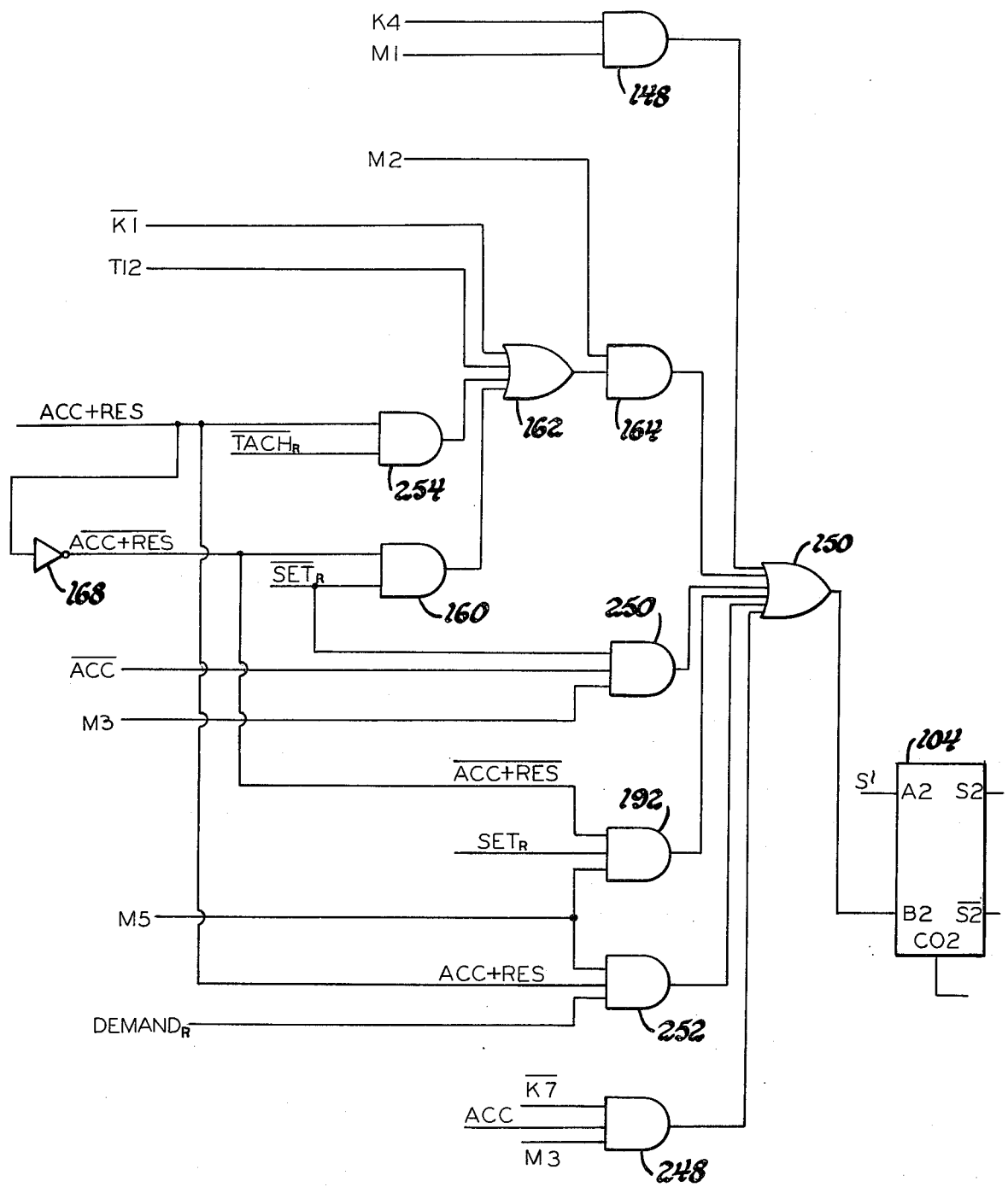

As shown in FIGS. 6 and 7 the processor 18 includes a full adder 102 having inputs A1 and B1 and an output S1. The processor further includes a second full adder 104 having inputs A2 and B2 and an output S2. The input A2 is connected with the S1 output of the adder 102 so that the S2 output of the adder 104 is the sum of the inputs at A1, B1 and B2. The data appearing at the A1 input to the adder 102 for each word time interval is depicted in the chart of FIG. 8 under the column designated A1. For example during $\overline{M_N}$, $M_0$ and $M_1$ (i.e., all word time other than M2, M3, M4 and M5) the A1 input is the content of the TACH register. The chart shown in FIG. 8 provides a convenient distillation of the various operations and data transfers occurring during the indicative time intervals and should be referred to in connection with the following discussion.

SPEED COMPUTATION

Computation of the actual speed of the vehicle is accomplished during $\overline{M_N}$ and M0 in accordance with the method set forth in aforementioned Ser. No. 690,848. The computation involves the addition of a constant to the content of the TACH register 26 during M0 and the subtraction of a fixed portion of the content of the TACH register 26 during $\overline{M_N}$ and M0.

During M0 the A1 input to the adder 102 is the content of the TACH register 26. This is accomplished by the logic shown in FIG. 6 including gates 106 and 108. It can be seen from the logic that during M0 all inputs other than TACH$_R$ to the gate 106 are low and consequently the content of the TACH register is inverted by the gate 106. During M0 the gates 110, 112 and 114 are all disabled so that the remaining inputs to the gate 108 are all zeros. Consequently, the inverted content of the TACH register 26 is again inverted by the gate 108 so that the content of the TACH register appears at the A1 input.

The constant K1 which is to be added to the content of the TACH register 26 in accordance with Ser. No. 690,848 is 4095 in the specific embodiment shown and is obtained by applying the signal K1, shown in FIG. 3, to the B1 input of adder 102 through gates 116 and 118. During M0 the signal K1 passes through the gate 116 and is inverted by the gate 118 to produce the constant 4095.

The term TACH/K2, where K2=$2^{11}$, is subtracted from the content of the TACH register during M0 and $\overline{M_N}$ in accordance with Ser. No. 690,848. The signal TACH/$2^{11}$ is obtained from the eleventh stage of the TACH register 26 thus providing at the input to the gate 119 the upper 5 bits of the TACH register 26 during the five least significant bit times thereby effecting a division operation. The signal TACH MASK shown in FIG. 3 masks out the remaining 11 bits of the TACH register 26. The gate 120 disables the gate 119 during M1, M2, M3, M4 and M5 so that only during M0 and $\overline{M_N}$ are the upper 5 bits of the TACH register provided at the output of the gate 119. These upper 5 bits are inverted by the gate 118 and consequently the term $-$TACH/$2^{11}$ is added to the TACH register during M0 and $\overline{M_N}$. During $\overline{M_N}$ and M0 a logic 0 is applied to the B2 so that the present vehicle speed appears at the S2 output of adder 104 and is fed to the TACH register 26.

Figure 9:
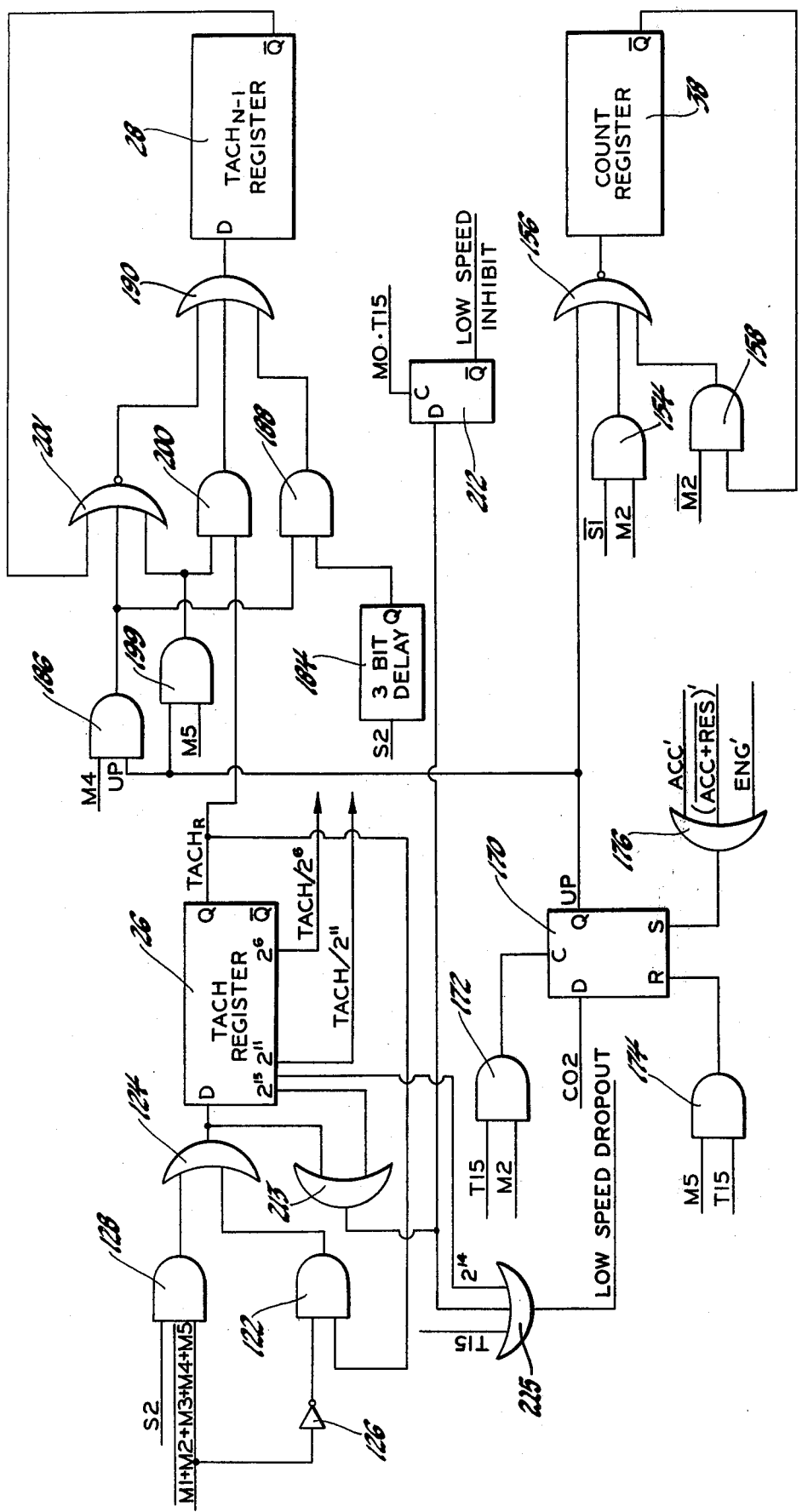

As shown in FIG. 9 the TACH$_R$ output is connected to the D input of the TACH register 26 through gates 122 and 124. Gate 122 is enabled during M1–M5 through inverter 126 so that during M1–M5 the content of the TACH register 26 is recirculated. During $\overline{M_N}$ and M0, gate 122 is disabled and gate 128 is enabled so that S2 is loaded into the register 26 through gates 128 and 124.

The constant K1 is selected to effect the desired scaling of the TACH register 26 while the constant K2 is selected as a function of the desired time constant at the computation frequency. The tachometer algorithm results in a digital output directly proportional to a variable frequency input with the output being filtered at a fixed time constant and independent of information rate.

CRUISE MODE OF OPERATION

Figure 10:
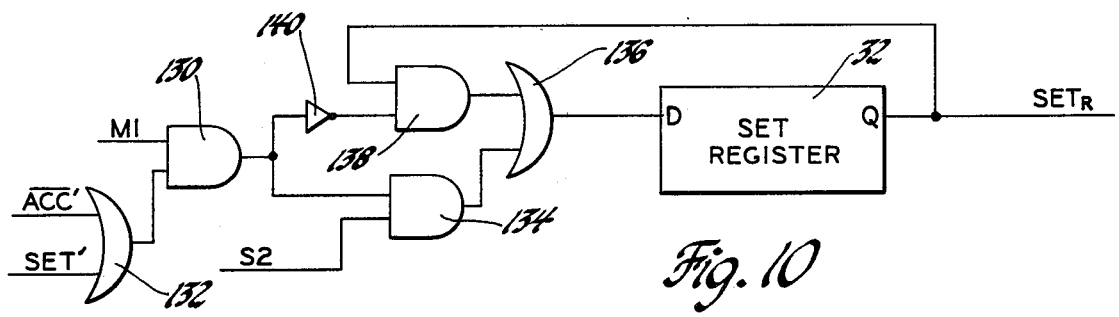

The cruise mode of operation is initiated upon release (following actuation) of the SET switch 42 which produces a 0–1 transition of the SET' signal. As shown in FIG. 10 this enables gate 130 through gate 132. The content of the TACH register 26, modified as described hereinafter, is then loaded into the SET register 32 through gates 134 and 136 during M1. At times other than M1, gate 134 is disabled and gate 138 is enabled through inverter 140 and the content of SET register 32 is recirculated through gates 138 and 136.

During M1, the A1 input is the content of the TACH register 26; the B1 input is TACH$_R$/K3 and the B2 input is K4 (FIG. 8). The quantity TACH$_R$/K3 is a lock-up error correction proportional to the desired cruising speed which is the speed represented by the content of the register 26 at the time the cruise mode is initiated. In the embodiment described herein K3 equals $2^6$. TACH$_R$/K3 is obtained from the sixth stage of the TACH register 26 (FIG. 9) which is connected to gate 142 through inverter 144 (FIG. 6). Thus the upper ten bits of the TACH register 26 are applied through gates 142, 146 and NOR gate 118 and appear at B1 during M1. The remaining 6 bits of the word are masked by the input designated $\overline{\text{LOCK/UP MASK}}$ (FIG. 3) which is applied to the gate 142. The lock/up error term is desirable because at increasingly higher vehicle speeds a proportionally higher duty cycle is required by the throttle actuator 16 to maintain the speed.

The constant K4 defines a lower duty cycle limit for the particular throttle valve actuator mechanism used. The throttle valve actuator mechanism may for example require a 25% duty cycle in order to maintain throttle valve position. In the embodiment herein described, K4 is produced by signal T12 and corresponds to a 25% duty cycle. As shown in FIG. 7, gate 148 is enabled during M1 so that the constant K4 appears at the B2 input through the gates 148 and 150. Thus during M1, S2 which is the content of the TACH register 26 corrected for a lock-up error and a duty cycle offset constant, is loaded into the SET register 32.

During M4, a derivative term computation is made and is utilized during M5 to obtain a smoother cruise control operation. The derivative term computation is made by sampling the vehicle speed at a substantially fixed time interval or update period to determine the change in speed since the previous update. The update period is approximately 0.25 seconds in the embodiment described and is a sufficiently long period to accumulate significant data relative to vehicle speed changes. The time interval to be used in the derivative term computation is obtained by counting the sender pulses and comparing the number of pulses counted with a number which is a function of the desired vehicle cruising speed.

Figure 4:
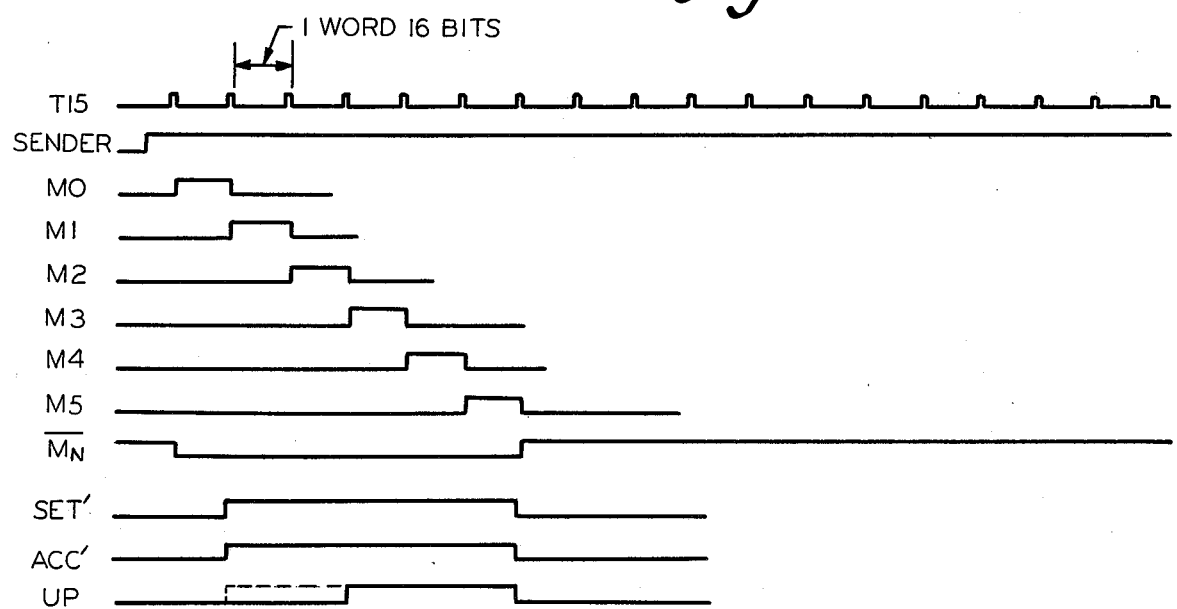

The COUNT register 38 is incremented one count each sender pulse. This operation is performed during M2. This is accomplished by applying the content of the COUNT register to the B1 input of the adder 102 (FIG. 6) through gates 152 and 118 while applying T0 to the A1 input of the adder 102 through gates 110 and 108. The sum of the A1 and B1 inputs is loaded into the COUNT register through gates 154 and 156. At all other word times the content of the COUNT register is recirculated through gates 158 and 156. After the counter is incremented during T0 of M2 the content of the COUNT register 38 is compared with the content of the SET register 32 by adding the COUNT register content to the inverse of the SET register content. As shown in FIG. 7 the inverse of the content of the SET register 32 is applied to the B2 input of adder 104 during M2 when the system is not in the ACCELERATE or RESUME mode of operation (which would include the CRUISE mode) through gates 160, 162, 164 and 150 under the control of signal $\overline{ACC + RES}$ obtained from inverter 168. The number of sender pulses to be counted is determined by the 4 most significant bits of the SET register 32. During steady state cruising these 4 bits will not change. The remaining bits of the SET register 32 are masked by the signal $\overline{K1}$ applied to gate 162. In the preferred embodiment a two-pole sender is utilized, as discussed in the aforementioned application Ser. No. 690,848. It is advantageous that the same sender pole be utilized in determining the number of sender pulses to be counted before an update signal is generated. To ensure that the update signal UP will be generated at an even number of sender pulses the inverse of the content of the SET register is logically ORed with a mask formed by T12 which effectively adds 1 to the least of the 4 most significant bits. When the content of the COUNT register 38 is equal to the 4 most significant bits of the SET register 32 the carryout C02 of adder 104 will go high. During T15 of M2 the flip-flop 170 (FIG. 9) will be clocked through gate 172 to drive UP high. UP will remain high until reset at T15 of M5 through gate 174. In addition to the periodic update thus produced, an update pulse is immediately generated upon actuation of the SET or ACCEL switches by setting flip-flop 170 through gate 176. This is depicted in the waveform of FIG. 4. When UP is high the COUNT register 38 is effectively reset through gate 156.

During M4 and M5 the inverted content of the TACH register 26 is applied to the A1 input of adder 102 through gates 114 and 108 under the control of gate 178 (FIG. 6) and the content of the $TACH_{N-1}$ register 28 is applied to the B1 input of adder 102 through gates 180 and 118 under the control of gate 182. During M4 the B2 input of adder 102 is logic 0 so that the S2 output is the difference between the content of the registers 26 and 28. This difference is amplified by a factor of 8 and temporarily stored in register 28 during the update period. The amplification is accomplished by delaying the S2 output of the adder 104 through the 3 bit delay 184 (FIG. 9). The logic controlling loading of this amplified speed error into the register 28 includes the gates 186, 188 and 190. The multiplication by 8 includes a multiplication by 4 to convert the change in speed over the approximate 0.25 second update period to a mile per hour per second derivative term and a further multiplication by 2 provides additional amplification of the derivative term. During M5 the content of the TACH register 26 is subtracted from the desired cruising speed contained in the SET register 32 to obtain the speed error. The content of the register 32 appears at B2 during M5 through gates 192 and 150. The derivative term temporarily stored in the $TACH_{N-1}$ register 28 during M4 is now added through gates 180 and 118 during M5 to the speed error thus obtained. The derivative term calculated during M4 always resists a change in speed regardless of the actual speed error. When the actual speed of the vehicle is far from the set speed the derivative term has little or no impact and the speed error is dominant. As the set speed is approached the speed error becomes much smaller and the derivative term becomes a much more significant factor in duty cycle computation.

Figure 11:
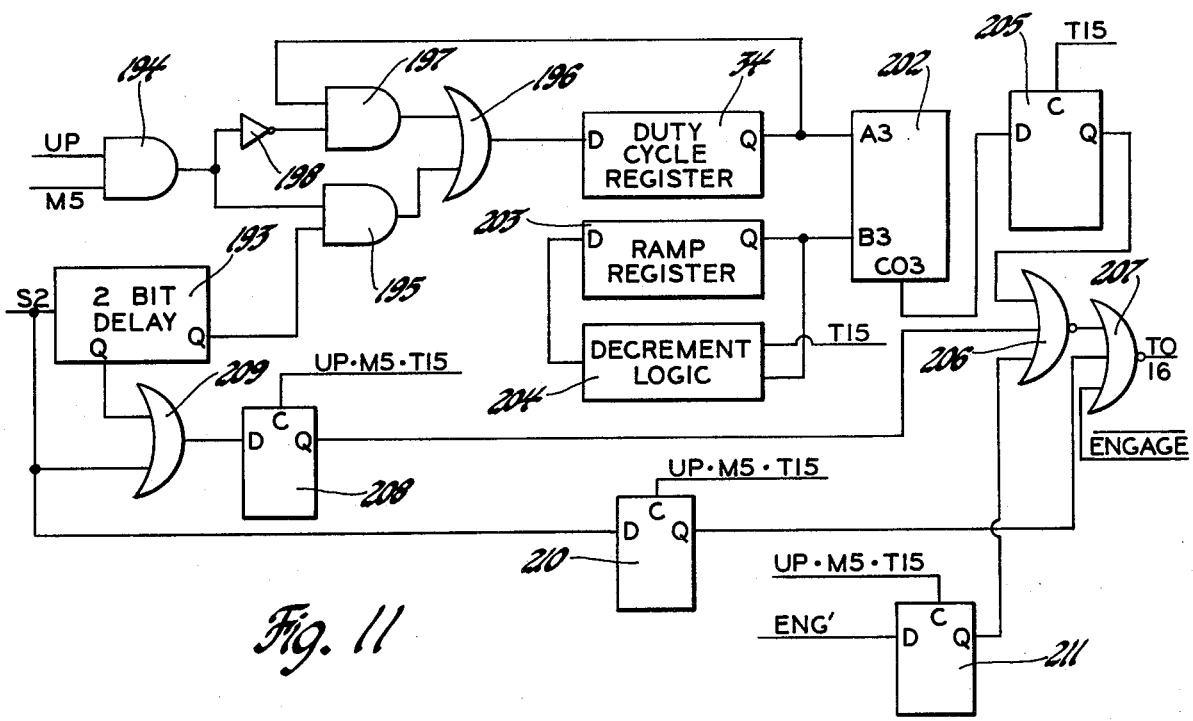

The sum of the speed error and the derivative term which appears at S2 is multiplied by 4 and loaded into the duty register 34 during M5. As shown in FIG. 11 the multiplication is accomplished by applying S2 through a two bit delay 193. The loading control logic includes gates 194, 195 and 196. At all other times the content of the duty register 34 is recirculated through gates 196 and 197 under control of gate 194 and inverter 198. At the same time the content of the TACH register 26 is transferred to the $TACH_{N-1}$ register 28 to be available for the next derivative term computation approximately 0.25 seconds later. This is accomplished under control of gates 199, 200 and 190 (FIG. 9). At all word times other than M4 and M5 the $TACH_{N-1}$ register 28 is recirculated through gates 201 and 190 under the control of gates 186 and 199.

During each machine cycle, i.e., every 16 bits, the digital word in the duty cycle register 34 is converted to a duty cycle by the converter 36. The converter 36 comprises a half-adder 202 (FIG. 11) having its A3 input connected with the register 34 and its B3 input connected with a RAMP register 203. The register 203 is an 8 bit register which is continuously decremented by the action of conventional decrement logic 204 to establish the frequency of the duty modulated signal. The carryout C03 of the half-adder 202 will be high as long as the inverse of the content of the register 203 is greater than the content of the register 34. When register 34 and the inverse of register 203 are equal the carryout C03 goes low. When the inverse of register 203 is decremented to 0 it folds over and C03 again goes high. The C03 output of the half-adder 202 is applied to the D input of a flip-flop 205 which is clocked from T15. The Q output of the flip-flop 205 is thus a constant frequency variable duty cycle signal with the duty cycle corresponding to the digital word in the register 34. It is possible during duty cycle computation and amplification that a command of greater than 100% duty cycle or less than 0% duty cycle could be requested. If this occurs it will be indicated, in the embodiment shown, by a 1 in one of the two most significant bits of the S2 input to the delay 193. Under these circumstances it is desirable to inhibit application of the computed duty cycle to the throttle actuator 16. To this end the Q output of the flip-flop 205 is applied to the throttle actuator 16 through gates 206 and 207. Gate 206 is controlled from flip-flop 208 which is clocked from the signal UP.M5.T15. The level of the two most significant bits is applied to the input to flip-flop 208 through gate 209 so that if either is a logic 1, the gate 206 will be disabled and the output of gate 207 will be driven high producing a 100% duty cycle assuming all other inputs to the gate 207 are low. If the most significant bit of S2 is a 1, this indicates a command of a negative duty cycle, i.e., less than 0%. If such is the case then flip-flop 210 is clocked high on UP.M5.T15 to override the effect of the flip-flop 208 and cause the output of gate 207 to go low producing a 0% duty cycle. 0% duty cycle is also produced if the signal $\overline{\text{ENGAGE}}$ is high, i.e., the flip-flop 90 (FIG. 5) is in a reset state. The signal LOW SPEED INHIBIT which is obtained from a flip-flop 212 (FIG. 9) and input to gate 96 (FIG. 5) prevent initiation of the CRUISE, ACCELERATE or RESUME modes of operation when the vehicle speed is below a certain minimum speed. The input to the flip-flop 212 is from a gate 213 which responds to the 2 most significant bits of the binary word representing the actual vehicle speed. If the upper 2 bits are both zeros then the vehicle speed is approximately 27 miles per hour or less (assigning a value of 56 miles per hour, respectively to the most significant bit). Accordingly, if the vehicle speed is below 27 miles per hour the $\overline{Q}$ output of the flip-flop 212 will be high and is applied through gate 96 (FIG. 5) to prevent setting of the flip-flop 90. The output of the gate 207 is also driven high to produce a 100% duty cycle for one update period whenever the system is engaged to overcome the problem of "droop" inherent in speed control systems. This is accomplished by the flip-flop 211. $\overline{\text{ENGAGE}}$ is also driven high through gate 100 by the signal LOW SPEED DROPOUT which is obtained from a gate 215 which responds to the 3 most significant bits of the actual speed data. Thus if the vehicle speed should drop below 14 miles per hour a 0% duty signal is applied to the throttle actuator 16.

ACCELERATE OR RESUME MODES OF OPERATION

Figure 12:
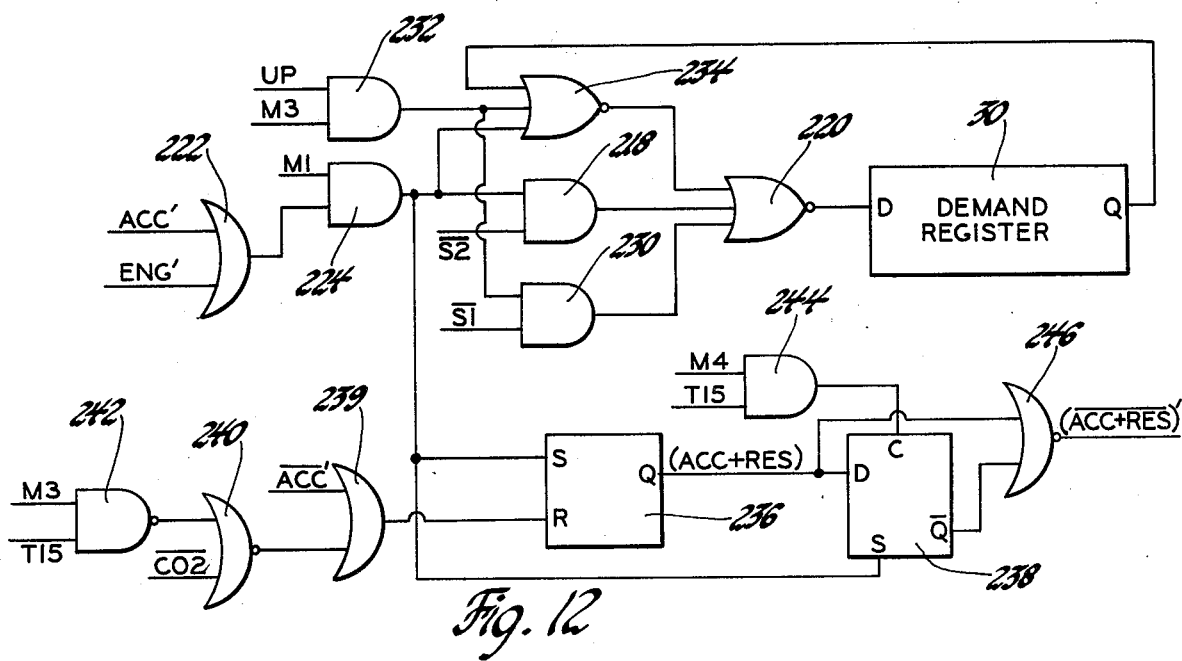

As previously shown, when the ACCEL switch 44 is depressed the signal ACC' is generated and when the RESUME switch 46 is released the signal RES' is generated and in turn generates ENG'. As shown in FIG. 12 either of these two signals causes the S2 output of adder 104 to be loaded into the DEMAND register 30 during M1 through gates 218 and 220 under the control of gates 222 and 224. The present vehicle speed is thus loaded into the DEMAND register 130. During M3 the DEMAND register 30 is incremented by the constant K5 which in the particular embodiment being described is equal to $2^7 + 2^6$ or about 0.328 miles per hour. This digital number is fed to the A1 input of adder 102 through gates 226, 112 and 108 (FIG. 6). Upon actuation of the ACCEL or RESUME switch the constant $K6 = 2^9 + 2^{10}$ is added to the constant $K5 = 2^7 + 2^6$ under control of AND gate 227 to develop a sufficient error term to cause the vehicle to immediately accelerate. During M3 the content of the DEMAND register 30 appears at the B1 input of the adder 102 through gates 228 and 118. The incremental addition to the DEMAND register content is then entered into the DEMAND register 30 through gates 230 and 220 during each update period under the control of gate 232. At all times other than M1 or M3 the content of the DEMAND register 30 is recirculated through gates 234 and 220.

The actuation of the ACCEL or RESUME switches also sets flip-flops 236 and 238. The signal (ACC + RES) is thus high when the system is in either the ACCELERATE or RESUME modes of operation. The flip-flop 236 is reset through gate 239 when the ACCEL switch 44 is released. Otherwise the flip-flop 236 is reset through the gates 240 and 242 on T15 of M3 when the targeted speed has been reached. The flip-flop 238 is clocked on T15 on M4 through gate 244. Gate 246 responds to the Q output of flip-flop 236 and the $\overline{Q}$ output of flip-flop 238 to produce a signal designated $\overline{(\text{ACC} + \text{RES})'}$ which is a momentary signal generated each time the system drops out of the ACCELERATE or RESUME modes of operation and sets the flip-flop 170 through gate 176 (FIG. 9).

If the system is placed in the ACCELERATE mode of operation (ACC) the content of the DEMAND register 30 is compared with a constant K7 corresponding to an upper speed limit. This is controlled by the gate 248 (FIG. 7). In the RESUME mode when $\overline{\text{ACC}}$ is high the DEMAND register 30 is compared with the SET register 32 under control of the gate 250. When the vehicle has been accelerated to the maximum speed limit K7 (ACCELERATE mode) or to the speed represented by the content of the SET register 32 (RESUME mode) the C02 output of the adder 104 goes high and the flip-flop 236 (FIG. 12) is reset on T15 of M3 through gates 242, 240, and 239. Until the flip-flop 236 is reset the duty cycle computation performed during M5 is based on the content of the DEMAND register under control of gate 252. After the flip-flop 236 is reset the duty cycle computation is based on the content of the SET register 32 as previously mentioned in connection with the CRUISE mode of operation. During the ACCELERATE or RESUME mode of operation the content of the COUNT register is compared with the content of the upper 4 bits of the TACH register rather than the upper 4 bits of the SET register during M2 under the control of gate 254 and flip-flop 236. It is desirable to inhibit the RESUME mode of operation prior to initiation of the CRUISE mode of operation because no target speed has been provided in SET register 32. A flip-flop 256 is set by the Power UP signal to drive the output designated RES. INH. high. RES. INH. disables gate 84 preventing initiation of the RESUME mode of operation. The flip-flop 256 will remain set until reset by SET' or $\overline{\text{ACC}}'$ through gates 258 and 260. Gate 260 also receives inputs from the flip-flops 64 and 212 which prevents reset of the flip-flop 256 while the brakes are applied or the vehicle speed is below the minimum speed for system engagement.

If desired the two switches 44 and 46 may be combined into a single switch. In this case it is desirable to inhibit acceleration except when in the CRUISE mode of operation. This is accomplished by feeding the output of gate 262 to gate 73 effectively inhibiting the ACCELERATE mode of operation except during the CRUISE mode of operation.

The operation of the present invention will now be summarized with reference to the chart shown in FIG. 8. Each sender pulse, the timing signals M0–M5 are generated. During M0 the TACH register is updated so that it contains the present speed of the vehicle. If the operator decides to enter the CRUISE mode of operation, he actuates and releases the SET switch which causes the content of the TACH register modified to correct for lock-up error and duty cycle offset to be loaded into the SET register during M1. During M4 a derivative term is computed based on the present vehicle speed and the vehicle speed present at the previous update. This derivative term is added to the difference between the content of the SET register and TACH register and amplified and loaded into the DUTY CYCLE register. Each word time the content of the DUTY CYCLE register is converted to a duty cycle modulated signal for controlling the throttle actuator. The DUTY CYCLE register and the $TACH_{N-1}$ register are updated periodically by comparing the number of sender pulses generated since the last update with the content of the SET register during M2.

Actuation of the brake switch will disengage the system. Subsequently if it is desired to return to the CRUISE mode at the previously set cruise speed, the resume switch is actuated and released. This causes the present speed to be loaded into the DEMAND register during M1. During M3 the DEMAND register is incremented and compared with the content of the SET register to determine if the set speed has been reached. If the set speed has not been reached, the difference between the TACH register and the DEMAND register plus the derivative term is loaded into the DUTY CYCLE register and the corresponding duty cycle signal is generated. Each update the DEMAND register is incremented and accordingly the vehicle is accelerated at a constant rate until the content of the DEMAND register exceeds the content of the SET register at which time the RESUME mode is terminated.

The vehicle may be accelerated from its present speed to a desired cruising speed by actuation of the ACCEL switch. The actuation of the ACCEL switch causes the same sequence of events to occur as previously described in connection with release of the RESUME switch except that the ACCELERATE mode is not automatically terminated until some predetermined upper speed limit has been reached. The ACCELERATE mode may be manually terminated by releasing the ACCEL switch at which time the present speed of the vehicle is loaded into the SET register during M1 and the CRUISE mode of operation is thereby entered.

Having thus described our invention what we claim is:

1. A speed control system for a motor vehicle comprising:

speed sensor means producing a pulse train containing sender pulses the frequency of which is related to present vehicle speed, operator actuable switch means for establishing a cruise mode of operation, register means including a present speed register, a prior speed register, a set speed register, and a duty cycle register, processor means responsive to said speed sensor means and said switch means for performing arithmetical operations in a predetermined sequence, said processor means being phased to said sender pulses so that certain of said operations are performed only in response to a sender pulse, said processor means developing a first binary word related to present vehicle speed in response to each of said sender pulses and loading said first binary word in said present speed register, said processor means loading a word related to the contents of said present speed register in said set speed register in response to initiation of a cruise mode of operation, said processor means loading the content of said present speed register in said prior speed register after a number of sender pulses depending on the content of said set speed register whereby the prior speed register is updated at a substantially constant update time, said processor means processing the contents of said present and prior speed register each update time to obtain a second binary word representing the rate of change of vehicle speed, said processor means processing the contents of said set speed register and said present speed register each update time to develop a third binary word related to the difference between an actual and a desired speed, said processor means adding said second binary word to said third binary word and loading a binary word related to the sum of said second and third binary words in said duty cycle register each update time, means cooperating with said duty cycle register for generating a substantially square wave output signal having a duty cycle related to the content of said duty cycle register, and throttle actuator means responsive to said output signal for controlling the speed of said vehicle.

2. A speed control system for a motor vehicle comprising:

speed sensor means producing a pulse train containing sender pulses the frequency of which are related to present vehicle speed, operator actuable switch means for establishing a cruise mode of operation, register means including a present speed register, a prior speed register, a set speed register, and a duty cycle register, processor means responsive to said speed sensor means and said switch means for performing arithmetical operations in a predetermined sequence, said processor means being phased to said sender pulses so that certain of said operations are performed only in response to a sender pulse, said processor means developing a first binary word related to present vehicle speed in response to each of said sender pulses and loading said first binary word in said present speed register, said processor means loading the content of said present speed register in said prior speed register at a substantially constant update time, said processor means loading a word related to the content of said present speed register in said set speed register in response to initiation of a cruise mode of operation, said processor means processing the contents of said present and prior speed register each update time to obtain a second binary word representing the rate of change of vehicle speed, said processor means processing the contents of said set speed register and said present speed register each update time to develop a third binary word related to the difference between an actual and a desired speed, said processor means adding said second binary word to said third binary word and loading a binary word related to the sum of said second and third binary words in said duty cycle register each update time, means cooperating with said duty cycle register for generating a substantially square wave output signal having a duty cycle related to the content of said duty cycle register, and throttle actuator means responsive to said output signal for controlling the speed of said vehicle.

3. A speed control system for a motor vehicle comprising:

speed sensor means producing a pulse train containing sender pulses the frequency of which are related to present vehicle speed, operator actuable switch means for establishing a cruise mode of operation, register means including a present speed register, a prior speed register, a set speed register, a count register, and a duty cycle register, processor means responsive to said speed sensor means and said switch means for performing arithmetical operations in a predetermined sequence, said processor means being phased to said sender pulses so that certain of said operations are performed only in response to a sender pulse, said processor means developing a first binary word related to present vehicle speed in response to each of said sender pulses and loading said first binary word in said present speed register, said processor means incrementing the contents of said count register by one count each sender pulse and comparing the contents of said count register with the contents of said set register to establish a substantially constant update period based on a predetermined relationship between the count and set registers, said processor means loading a word related to the contents of said present speed register to said set speed register in response to initiation of a cruise mode of operation, said processor means loading the content of said present speed register in said prior speed register during said update period, said processor means processing the contents of said present and prior speed register each update period to obtain a second binary word representing the rate of change of vehicle speed since the previous update period, said processor means processing the contents of said set speed register and said present speed register each update time to develop a third binary word related to the difference between an actual and a desired speed, said processor means adding said second binary word to said third binary word and loading a binary word related to the sum of said second and third binary words in said duty cycle register each update time, means cooperating with said duty cycle register for generating a substantially square wave output signal having a duty cycle related to the content of said duty cycle register, and throttle actuator means responsive to said output signal for controlling the speed of said vehicle.

4. A speed control system for a motor vehicle comprising:

speed sensor means producing a pulse train containing sender pulses the frequency of which are proportional to present vehicle speed, operator actuable switch means for establishing a cruise mode of operation, register means including a present speed register, a prior speed register, a set speed register, and a duty cycle register, processor means for performing arithmetical operations, said processor means including an adder and control logic means, said processor means further including timing means for providing synchronization pulses and mark generator means responsive to said speed sensor means and said timing means for producing a plurality of sequential data processing intervals each sender pulse, said control logic means responsive to said mark generator means, said timing means, and said switch means for controlling the application of the contents of said register means to said adder to perform said operations during said intervals, said processor means developing a first binary word related to present vehicle speed in response to each of said sender pulses and loading said first binary word in said present speed register, said processor means loading a binary word related to the contents of said present speed register to said set speed register in response to initiation of a cruise mode of operation, said processor means loading the content of said present speed register in said prior speed register, after a number of sender pulses as determined by the content of said set register whereby the prior speed register is updated at a substantially constant update time, said processor means processing the contents of said present and prior speed register each update time to obtain a second binary word representing the rate of change of vehicle speed, said processor means subtracting the contents of said set speed register and said present speed register and adding said second binary word to the difference thereof, to develop a third binary word, said processor means loading said third binary word in said duty cycle register each update time, means cooperating with said duty cycle register for generating a substantially square wave output signal having a duty cycle related to the content of said duty cycle register, and throttle actuator means responsive to said output signal for controlling the speed of said vehicle.

5. A speed control system for a motor vehicle comprising:

speed sensor means producing a pulse train containing sender pulses the frequency of which are related to present vehicle speed, operator actuable switch means for initiating a cruise mode of operation or a resume mode of operation and for terminating said cruise mode of operation, register means including a present speed register, a set speed register, a demand register, and a duty cycle register, processor means responsive to said speed sensor means and said switch means for processing and updating the contents of said register means, said processor means developing a first binary word related to present vehicle speed in response to said sender pulses and loading said first binary word in said present speed register, said processor means also loading a second binary word related to said first binary word in said set speed register in response to initiation of a cruise mode of operation and in said demand register in response to initiation of said resume mode of operation, said second binary word remaining in said set speed register upon termination of said cruise mode of operation, said processor means periodically processing the contents of said set speed register and said present speed register while the system is in said cruise mode of operation to develop a third binary word related to the difference between a present and a desired speed, said processor means periodically incrementing the content of said demand register by a predetermined amount and processing the contents of said demand register and said present speed register while the system is in said resume mode of operation to develop a fourth binary word proportional to the difference between a present and a demanded speed, said processor means periodically loading a binary word related to said third or fourth binary word in said duty cycle register depending upon whether the system is in said cruise or resume mode of operation respectively, said processor terminating said resume mode of operation and initiating said cruise mode of operation when the content of said demand register exceeds the content of said set register, means cooperating with said duty cycle register for generating a substantially square wave output signal having a duty cycle proportional to the content of said duty cycle register, and throttle actuator means responsive to said output signal for controlling the speed of said vehicle.

6. A speed control system for a motor vehicle comprising:

speed sensor means producing a pulse train containing sender pulses the frequency of which are related to present vehicle speed, operator actuable switch means for initiating and terminating an accelerate mode of operation, register means including a present speed register, a set speed register, a demand register, and a duty cycle register, processor means responsive to said speed sensor means and said switch means for processing and updating the contents of said register means, said processor means developing a first binary word related to present vehicle speed in response to said sender pulses and loading said first binary word in said present speed register, said processor means also loading a second binary word related to said first binary word in said set speed register in response to initiation of a cruise mode of operation and in said demand register in response to initiation of said accelerate mode of operation, said processor means periodically processing the contents of said set speed register and said present speed register during said cruise mode of operation to develop a third binary word related to the difference between a present and a desired speed, said processor means periodically incrementing the content of said demand register by a predetermined amount and processing the contents of said demand register and said present speed register to develop a fourth binary word related to the difference between a present and a demanded speed, said processor means periodically loading a binary word related to said third or fourth binary word in said duty cycle register depending upon whether the system is in said cruise or accelerate mode of operation respectively, said processor initiating said cruise mode of operation upon termination of said accelerate mode of operation, means cooperating with said duty cycle register for generating a substantially square wave output signal having a duty cycle related to the content of said duty cycle register, and throttle actuator means responsive to said output signal for controlling the speed of said vehicle.

7. The system defined in claim 6 wherein said processor means automatically terminates said accelerate mode of operation when said vehicle reaches a predetermined speed.

8. A speed control system for a motor vehicle comprising:

speed sensor means producing a pulse train containing sender pulses the frequency of which are related to present vehicle speed, operator actuable switch means for establishing a cruise mode of operation or a resume mode of operation and for terminating said cruise mode of operation, register means including a present speed register, a prior speed register, a set speed register, a demand register, and a duty cycle register, processor means responsive to said speed sensor means and said switch means for processing and updating the contents of said register means, said processor means developing a first binary word related to present vehicle speed in response to each of said sender pulses and loading said first binary word in said present speed register, said processor means also loading a second binary word related to said first binary word in said set speed register and said demand register in response to initiation of a cruise mode of operation, said second binary word remaining in said set speed register after termination of said cruise mode of operation, said processor means loading the content of said present speed register in said prior speed register after a number of sender pulses depending on the content of one of said present or set speed registers whereby the prior speed register is updated at a substantially constant update time, said processor means processing the contents of said present and prior speed register each update time to obtain a third binary word representing the rate of change of vehicle speed, said processor means processing the contents of said set speed register and said present speed register each update time to develop a fourth binary word proportional to the difference between a present and a desired speed, said processor means incrementing the content of said demand register by a predetermined amount each update time and processing the contents of said demand register and said present speed register to develop a fifth binary word proportional to the difference between a present and a demanded speed, said processor means adding said third binary word to said fourth or fifth binary word depending upon whether the system is in said cruise or resume mode of operation respectively and loading a binary word proportional to the sum in said duty cycle register each update time, said processor terminating said resume mode of operation and initiating said cruise mode of operation when the content of said demand register exceeds the content of said set register, means cooperating with said duty cycle register for generating a substantially square wave output signal having a duty cycle proportional to the content of said duty cycle register, and throttle actuator means responsive to said output signal for controlling the speed of said vehicle.

9. A speed control system for a motor vehicle comprising:

speed sensor means producing a pulse train containing sender pulses the frequency of which are proportional to present vehicle speed, operator actuable switch means for establishing a plurality of modes of operation including a cruise mode, an accelerate mode and a resume mode and for terminating said modes of operation, register means including a present speed register, a prior speed register, a set speed register, a demand register, and a duty cycle register, processor means responsive to said speed sensor means and said switch means for processing and updating the contents of said register means, said processor means developing a first binary word related to present vehicle speed in response to each of said sender pulses and for loading said first binary word in said present speed register, said processor means loading the content of said present speed register in said prior speed register after a number of sender pulses depending on the content of one of said present or set speed registers whereby the prior speed register is updated at a substantially constant update time, said processor means also loading a second binary word related to said first binary word in said set speed register in response to said cruise mode of operation and said demand register in response to initiation of said accelerate mode of operation, said second binary word remaining in said set speed register upon termination of said cruise mode of operation, said processor means updating the content of said set speed register each sender pulse while said system is in said accelerate mode of operation, said processor means processing the contents of said present and prior speed register each update time to obtain a third binary word representing the rate of change of vehicle speed, said processor means processing the contents of said set speed register and said present speed register each update time to develop a fourth binary word related to the difference between an actual and a desired speed, said processor means incrementing the content of said demand register by a predetermined amount each update time and processing the contents of said demand register and said present speed register to develop a fifth binary word related to the difference between a present and a demanded speed, said processor means adding said third binary word to said fourth binary word when said system is in said cruise mode of operation to produce a sixth binary word, said processor means adding said third binary word to said sixth binary word when said system is in said accelerate or resume mode of operation to produce a seventh binary word, said processor means loading said sixth binary word in said duty cycle register each update time if said system is in said cruise mode of operation, said processor means loading said seventh binary word in said duty cycle register each update time if said system is in said accelerate or resume mode of operation, said processor means terminating said resume mode of operation and initiating said cruise mode of operation when the content of said demand register exceeds the content of said set register, said processor means terminating said accelerate mode of operation and initiating said cruise mode of operation upon operator actuation of said switch means to a position terminating said accelerate mode of operation, means cooperating with said duty cycle register for generating a substantially square wave output signal having a duty cycle related to the content of said duty cycle register, and throttle actuator means responsive to said output signal for controlling the speed of said vehicle.

10. A speed control system for a motor vehicle comprising:

speed sensor means producing a pulse train containing sender pulses the frequency of which are related to present vehicle speed, operator actuable switch means for initiating a cruise mode of operation or a resume mode of operation and for terminating said cruise mode of operation, register means including a present speed register, a set speed register, a demand register, a count register, and a duty cycle register, processor means responsive to said speed sensor means and said switch means for processing and updating the contents of said register means, said processor means developing a first binary word related to present vehicle speed in response to said sender pulses and loading said first binary word in said present speed register, said processor means incrementing the contents of said count register by one count each sender pulse and comparing the contents of said count register with the contents of said present speed register to establish a substantially constant update period based on a predetermined relationship between the count and present speed registers, said processor means also loading a second binary word related to said first binary word in said set speed register in response to initiation of a cruise mode of operation and in said demand register in response to initiation of said resume mode of operation, said second binary word remaining in said set speed register upon termination of said cruise mode of operation, said processor means periodically processing the contents of said set speed register and said present speed register while the system is in said cruise mode of operation to develop a third binary word related to the difference between a present and a desired speed, said processor means periodically incrementing the content of said demand register by a predetermined amount each update period and processing the contents of said demand register and said present speed register while the system is in said resume mode of operation to develop a fourth binary word proportional to the difference between a present and a demanded speed, said processor means computing and periodically loading a fifth binary word related to said third or fourth binary word in said duty cycle register depending upon whether the system is in said cruise or resume mode of operation respectively, said processor terminating said resume mode of operation and initiating said cruise mode of operation when the content of said demand register exceeds the content of said set register, means cooperating with said duty cycle register for generating a substantially square wave output signal having a duty cycle proportional to the content of said duty cycle register, and throttle actuator means responsive to said output signal for controlling the speed of said vehicle.

11. A speed control system for a motor vehicle comprising:

speed sensor means producing a pulse train containing sender pulses the frequency of which are related to present vehicle speed, operator actuable switch means for initiating a cruise mode of operation or a resume mode of operation and for terminating said cruise mode of operation, register means including a present speed register, a set speed register, a demand register, a count register, and a duty cycle register, processor means responsive to said speed sensor means and said switch means for processing and updating the contents of said register means, said processor means developing a first binary word related to present vehicle speed in response to said sender pulses and loading said first binary word in said present speed register, said processor means incrementing the contents of said count register by one count each sender pulse and comparing the contents of said count register with the contents of said present speed register to establish a substantially constant update period based on a predetermined relationship between the count and present speed registers, said processor means also loading a second binary word related to said first binary word in said set speed register in response to initiation of a cruise mode of operation and in said demand register in response to initiation of said resume mode of operation, said second binary word remaining in said set speed register upon termination of said cruise mode of operation, said processor means periodically processing the contents of said set speed register and said present speed register while the system is in said cruise mode of operation to develop a third binary word related to the difference between a present and a desired speed, said processor means periodically incrementing the content of said demand register by a predetermined amount each update period and processing the contents of said demand register and said present speed register while the system is in said resume mode of operation to develop a fourth binary word proportional to the difference between a present and a demanded speed, said processor means computing and periodically loading a fifth binary word related to said third or fourth binary word in said duty cycle register depending upon whether the system is in said cruise or resume mode of operation respectively, said processor terminating said resume mode of operation and initiating said cruise mode of operation when the content of said demand register exceeds the content of said set register, means cooperating with said duty cycle register for generating a substantially square wave output signal having a duty cycle proportional to the content of said duty cycle register, logic means for decoding said fifth binary word to determine whether the duty cycle computed is either greater than 100% or less than 0% and if so to drive said output signal to 100% duty cycle or 0% duty cycle respectively, and throttle actuator means responsive to said output signal for controlling the speed of said vehicle.

* * * * *

UNITED STATES PATENT OFFICE
CERTIFICATE OF CORRECTION

PATENT NO. : 4,138,723

DATED : February 6, 1979

INVENTOR(S) : Carl A. Nehmer and Douglas W. Sweet

It is certified that error appears in the above-identified patent and that said Letters Patent are hereby corrected as shown below:

Column 4, line 11, "M0.T15.$\overline{\text{Brake}}$" should read -- M0·T15·$\overline{\text{Brake}}$ --;

Column 4, line 14, "M5.T15." should read -- M5·T15. --;

Column 4, line 64, "M0.M15.$\overline{\text{Brake}}$." should read -- M0·M15·$\overline{\text{Brake}}$. --.

Column 5, line 43, "indicative" should read -- indicated --.

Column 9, line 68, "register 130." should read -- register 30. --.

Signed and Sealed this

Nineteenth Day of June 1979

[SEAL]

Attest:

RUTH C. MASON
Attesting Officer

DONALD W. BANNER
Commissioner of Patents and Trademarks